United States Patent
Adams

(10) Patent No.: US 9,304,977 B2
(45) Date of Patent: Apr. 5, 2016

(54) METHODS AND APPARATUS FOR CHARACTER SET CONTROL, VERIFICATION AND REPORTING

(71) Applicant: eBay Enterprise, Inc., King of Prussia, PA (US)

(72) Inventor: Scott Adams, King of Prussia, PA (US)

(73) Assignee: eBay Enterprise, Inc., King of Prussia, PA (US)

(*) Notice: Subject to any disclaimer, the term of this patent is extended or adjusted under 35 U.S.C. 154(b) by 214 days.

(21) Appl. No.: 13/946,435

(22) Filed: Jul. 19, 2013

(65) Prior Publication Data

US 2015/0026828 A1 Jan. 22, 2015

(51) Int. Cl.
| | |
|---|---|
| G06K 9/18 | (2006.01) |
| G06F 17/22 | (2006.01) |
| G06F 9/44 | (2006.01) |
| G06K 9/34 | (2006.01) |
| G06K 9/68 | (2006.01) |
| G06F 17/27 | (2006.01) |

(52) U.S. Cl.
CPC .......... *G06F 17/2217* (2013.01); *G06F 9/4448* (2013.01); *G06F 17/2223* (2013.01); *G06F 17/275* (2013.01); *G06K 9/344* (2013.01); *G06K 9/6821* (2013.01); *G06K 2209/01* (2013.01)

(58) Field of Classification Search
CPC . G06F 17/2223; G06F 17/275; G06F 9/4448; G06K 2209/01; G06K 9/344; G06K 9/6821
See application file for complete search history.

(56) References Cited

U.S. PATENT DOCUMENTS

| | | | | |
|---|---|---|---|---|
| 6,049,869 | A * | 4/2000 | Pickhardt | G06F 17/30985 707/E17.041 |
| 8,264,385 | B1 * | 9/2012 | Dewan et al. | 341/50 |
| 8,296,124 | B1 * | 10/2012 | Holsztynska et al. | 704/2 |
| 2005/0125731 | A1 * | 6/2005 | Jurion | G06F 17/2223 715/262 |
| 2006/0025988 | A1 * | 2/2006 | Xu et al. | 704/8 |

\* cited by examiner

*Primary Examiner* — Stephen R Koziol
*Assistant Examiner* — Jonathan S Lee
(74) *Attorney, Agent, or Firm* — Schwegman Lundberg & Woessner, P.A.

(57) ABSTRACT

Systems and methods for character set control, verification and reporting are provided. In an example embodiment, a data evaluation system comprises at least one module, executing on one or more computer processors, to implement a language and character set phase in which an authorized character set comprising authorized characters is defined; a document phase including receipt of an input document, the input document comprising document characters; a detection phase including a comparison of the document characters against the authorized characters in the authorized character set to detect unauthorized characters in the input document not forming part of the authorized character set; and a reporting phase including display of the unauthorized characters to a user.

18 Claims, 6 Drawing Sheets

US 9,304,977 B2

METHODS AND APPARATUS FOR CHARACTER SET CONTROL, VERIFICATION AND REPORTING

TECHNICAL FIELD

An embodiment relates generally to the technical field of data analysis and document translation. In one example embodiment, the disclosed subject matter relates to methods and systems for character set control, verification and reporting.

BACKGROUND

The use of international character sets in data or text translation, for example, needs to be considered very carefully to make sure that the results of the translation appear to the translator or recipient as intended. In an ecommerce application, for example, a description of a commercial product in an English website might include English text in the body of the product description. The text and accompanying labels, commentary and so forth may call for translation if the website is ever internationalized for use in other global markets, for example. It is very likely that the translations of the product description may call for names, words or characters that contain letters from other languages. To complicate things further, international names are sometimes encoded using different character sets than the text of the original home language. Inconsistencies or inaccuracies in the translation and appearance of an internationalized website may frequently occur. Such errors can detract seriously from the general appeal and marketability of the product displayed in the internationalized website. A poor on-line appearance can easily translate into a strong perception of poor product quality and can significantly impact potential product sales. Accuracy in product description and overall visual appeal is thus very important in ecommerce applications, especially when global markets are targeted. It will be appreciated that leading, global ecommerce websites will have many millions of content documents associated with them. The detection of inconsistencies and inaccuracies in these files when translated can be enormously time consuming, inaccurate, and difficult to control. The present subject matter seeks to address these and other problems.

SUMMARY

In an example embodiment, the present subject matter provides a data evaluation system comprising at least one module, executing on one or more computer processors, to implement a language and character set phase in which an authorized character set comprising authorized characters is defined; a document phase including receipt of an input document, the input document comprising document characters; a detection phase including a comparison of the document characters against the authorized characters in the authorized character set to detect unauthorized characters in the input document not forming part of the authorized character set; and a reporting phase including display of the unauthorized characters to a user.

In another example embodiment, the present subject matter provides a machine readable medium, including instructions, which when read by a machine, causes the machine to perform the following: a language and character set phase in which an authorized character set comprising authorized characters is defined; a document phase including receipt of an input document, the input document comprising document characters; a detection phase including a comparison of the document characters against the authorized characters in the authorized character set to detect unauthorized characters in the input document not forming part of the character set; and a reporting phase including display of the unauthorized characters to a user.

BRIEF DESCRIPTION OF THE DRAWINGS

An embodiment is illustrated by way of example and not limitation in the Figures of the accompanying drawings, in which like references indicate similar elements and in which.

DETAILED DESCRIPTION

Methods and systems for character set control, verification and reporting are described. In the following description, for purposes of explanation, numerous specific details are set forth in order to provide a thorough understanding of the present disclosure. It will be evident, however, to one skilled in the art that the subject matter of the present disclosure may be practiced without these specific details. In some examples, the subject matter described and claimed herein can be used for language translations. It will be appreciated however that the subject matter can be applied simply to evaluate or compare data, for example in order to evaluate characters in a data file irrespective of whether the characters are part of a translation exercise, or not.

Figure 6A:
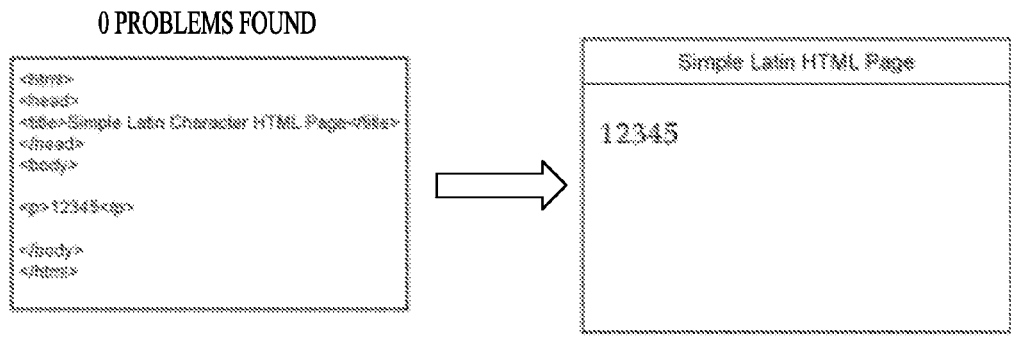
FIGS. 6A-6D show example reports of an example system, according to various embodiments described herein.
Figure 6B:
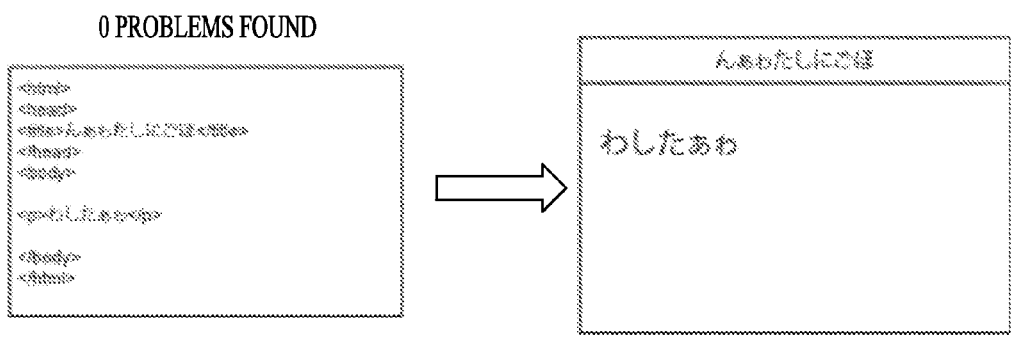
Figure 6C:
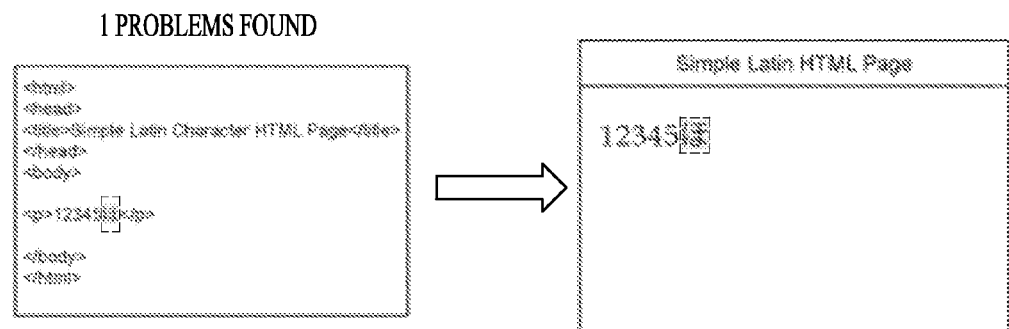
Figure 6D:
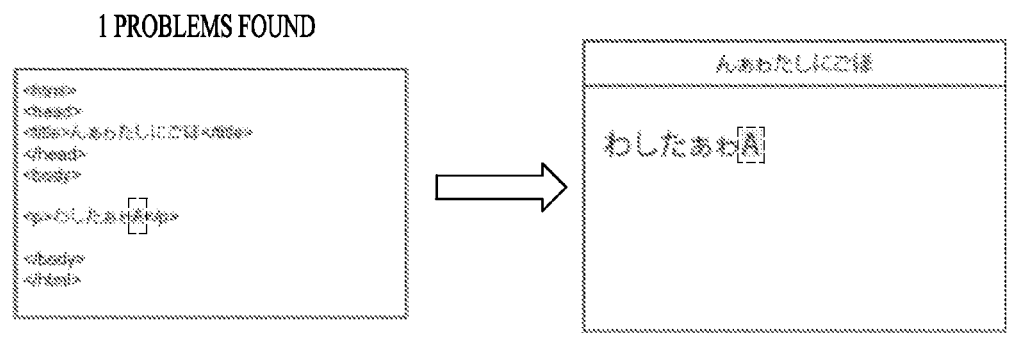

The present subject matter generally provides a data evaluation system that will allow a user to create or use a predefined set of characters associated with a language to verify that any number of given input documents contain, upon translation, only the characters defined as being within the scope of that language. When characters outside of the language scope are found, the system will identify these and their location within the input documents. In an ecommerce application, for example, a webpage may need to be internationalized from English to Japanese and may call for appropriate translation. In the Japanese site, it may be determined for example that the names Hiragana, Katakana, Kanji and the Latin Numerals (0123456789) are the only authorized characters (besides Japanese) that may appear in the Japanese website. In an example of the system described herein, the system reviews all the files that make up the Japanese internationalized site and locates any characters that are not in the authorized character sets previously defined, reports on those characters found, and identifies their location in the files in which the unauthorized characters were found. With reference to FIGS. 6A-6D of the accompanying drawings, examples of system reports reporting on the identification and location of unauthorized characters are shown. In the examples shown in FIGS. 6A-6B, no unauthorized characters are found in a translated document, as reflected by the output "0 Problems Found". In the sample views shown in FIGS. 6C-6D, an unauthorized character is identified, as reflected by the output "1 Problem Found". For example, in FIG. 6C, an unauthorized Japanese character has been identified. In FIG. 6D, an unauthorized English letter has been identified. In each view, the location of the unauthorized character in a string of characters is shown, and further location information such as "head", body", or "title" can be provided, for example.

In some examples, characters that make up a character set are defined by Unicode standards and are pre-grouped by language. Other codes are possible. Unicode is a character encoding standard, developed by the Unicode Consortium, that defines a set of letters, numbers, and symbols that represent almost all of the written languages in the world. Its success at unifying character sets has led to widespread use in the internalization and localization of computer software.

In some examples, a user of the system may take entire languages, numeric, and/or symbol sets, and add or remove individual characters to define one or more sets of valid characters for input items to be checked against and verified for accuracy and consistency in appearance in translated form. In some examples, adapters can be written for various different forms of input documents (.html, .xml, .txt, and so forth) that will allow the system to accept various forms of documents as input. The format and content of the input documents may be manipulated to facilitate the character set control, verification and reporting methods described herein. Once an input is made into the system, the system will go through those input documents and find any characters that are not part of the defined character set and generate a report for the user indicating that invalid characters were found, the file where each one was found, and the locations within those files where they were found.

For the purposes of this specification, the following definitions and concepts may be used. A "document" may include any number of different file inputs. These can be anything from Word documents to emails to web pages. A "character" may include a single letter, numeral, symbol or punctuation. A "predefined" or "standardized" language may include a predefined character set representing the standard characters belonging to a language. A "custom configured language" may include a configuration-based modification of a language. In one example, a custom configured language may include Japanese language and English numerals. A "custom configured character set" may include a character set defined from scratch as opposed to a modified standardized language. An "original" document refers to an original document in its unmodified state. A "unique character" document may include an original document stripped of all markup and tags and duplicate characters, leaving only a list of the unique characters found in the original document. For example, a Word document reading "AAABBBBCCCC" would be rendered as "ABC" in a unique character document.

The term "phase" refers to each of the different larger units of work performed by the described system and methods. Each phase may be governed by software included in the system. For example, in a "language/character set" phase, character sets may be defined. In a "document" phase, input documents may be injected into the system. The documents may in some examples be input in canonical formats, i.e. in simplified or standard forms. In a "detection" phase, documents may be compared to character sets to detect which characters in the document do not form part of the character set. These characters not forming part of the character set may be referred to as unauthorized characters. In a "reporting" phase, the list of characters detected in the detection phase may be reported out in a user defined way.

Figure 1:
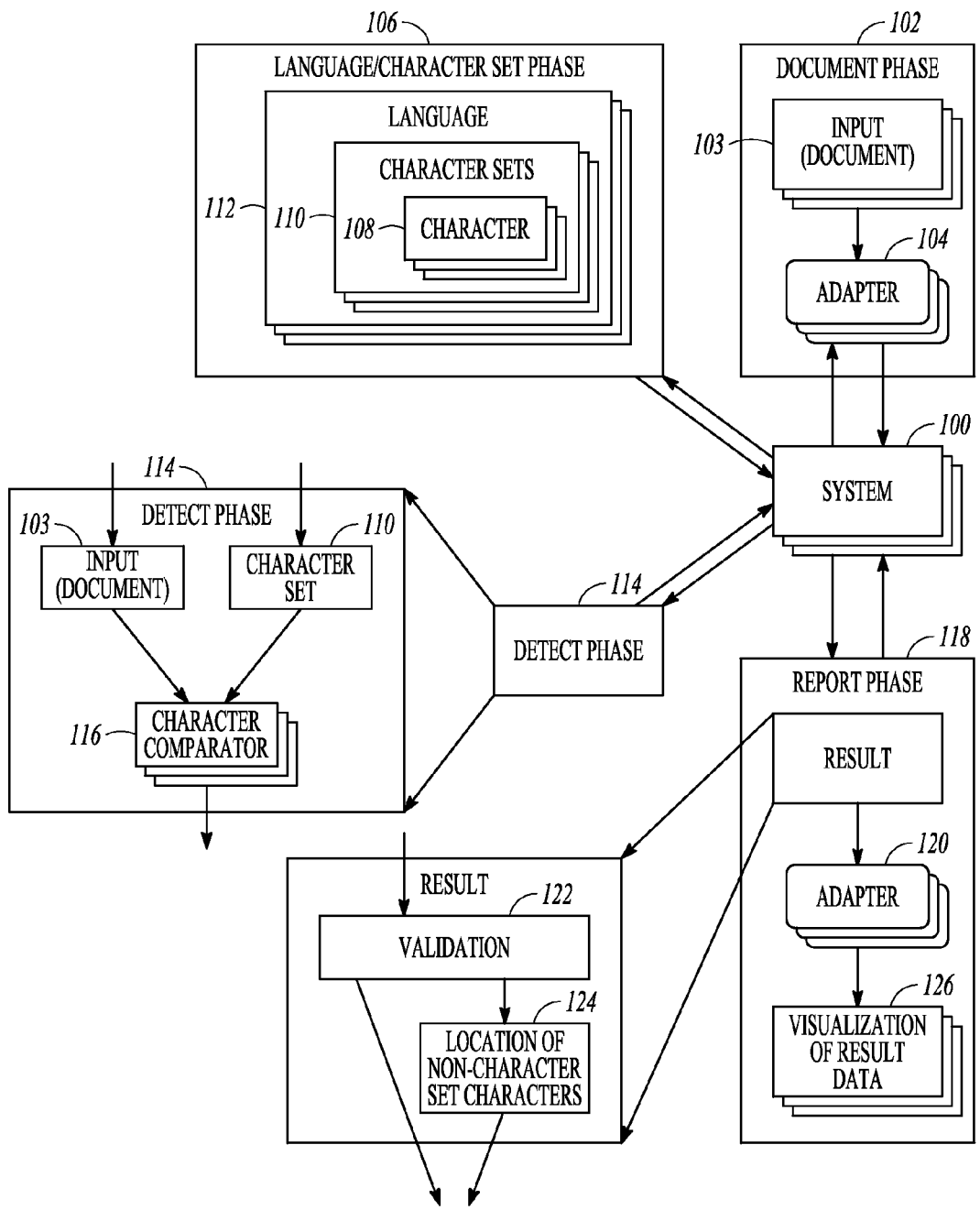
FIG. 1 is a diagram depicting an example system and method, according to an example embodiment.

Reference is now made to FIG. 1 of the accompanying drawings which generally depicts a data evaluation system 100 for character set control, verification and reporting in accordance with the example embodiments described herein. The system 100 may include components, modules and software for implementing the various phases and operations included within example method embodiments of the present subject matter.

In an example document phase 102 shown generally, an original document 103 is input into the system 100. Based on the document type which is input into the system 100, system software removes all formatting commands and document markup and produces a simple text-only version of the document 103. The system 100 then produces a list of unique characters found within the text only document. This list may be referred to as a unique character document. The removal or de-duplication operation allows a detection phase described further below to ignore elements that are part of document markup which should not be considered as part of the displayed characters to be validated against a predefined character set.

In some examples, an input document 103 is passed into a document factory class during the document phase 102. This factory class reviews the document 103, determines its type, and assesses whether the system 100 already includes an implemented adapter 104 for it. If the document type is not supported by a pre-existing adapter, an unsupported exception is sent within the system 100 so that an appropriate adapter may be created. If the document 103 is supported, the factory class will send the document to the adapter 104, which makes a copy of the document 103 stripped of any markup to leave only the displayed characters stored in a string. After the string is created, the adapter 104 removes multiple occurrences of each character, leaving a string with only the unique display characters in it. This string is passed back to the document factory class, which passes the original document 103 and the unique character string to the system 100 as a unique java class object (or document object).

Referring again to FIG. 1, an example language phase 106 is shown generally. Within this phase 106, a character 108 may be included within a character set 110 which may in turn be included within or make up a language 112. In some examples, and using files that represent each character 108 within a given language 112, software within the system 100 processes each of these files and sorts and aggregates them into character sets 110. In some examples, a character set 110 may include a group of alpha, numeric, punctuation and symbols for a specific language 112.

Some examples allow three ways in which the character sets 110 can be defined. In a predefined or standardized language option, the system software provides default character sets 110 on a per language basis. As mentioned above, a predefined or standardized language 112 may include a predefined character set 110 representing the standard characters belonging to a language. In some examples, such a character set 110 may include all alpha, numeric, punctuation and symbols that are supported by or included within the predefined or standardized language 112.

In a custom configured language option, custom character sets can be defined via a configuration in which a standard language is taken and another language is combined with it. For example, Japanese and English may be combined to make a new character set in which all characters in both languages are valid. In some examples, individual characters or sub-sections of characters are added. For example, Japanese language may be combined with English numerals and punctuation. In some examples, individual characters or sub-sections of characters are removed. For example, Japanese characters with the English name Kanji may be removed from the custom configured language 112. In a custom configured character set option, custom configured character sets can be configured to provide unique, custom sets of characters that do not easily map to the standard or custom configured language options.

In other examples of the language phase 106, an application within the system 100 starts up and a file directory, consisting of folders for defined languages and their subtypes, may be navigated. In this file structure are XML files that represent supported or authorized characters 108. Based on the XML file's location within the directory structure, and information contained in the XML, a character object will be created for each character 108. The character object may include the Unicode value of the character 108, a unique ID, the language it is part of, and the type of character it is (alpha, numeric, symbol, or punctuation). The authorized characters 108 may be combined into character sets 110 which each represent a predefined language 112. After the entire character file structure is read, configuration files of the system 100 can also trigger new character sets 110 (or languages 112) to be created by taking existing character sets 110 and either combining them with other sets, removing sets, or adding new subsets to other existing sets. The system 100 can also use this configuration to define a character set 110 from scratch rather than as a modification of an existing set.

In an example detection phase 114 shown generally, the system 100 uses the character set 110 created in the language phase 106 and the unique character list or string from the document phase 102 to run a comparator module 116, which iterates through each character 108 in the unique character list or string to detect if each character 108 is part of the predefined (authorized) character set 110. Any detected character 108 which is not included in the authorized language character set 110 is entered into a character array and passed along to a reporting phase 118. In some examples, the character array is passed along with the input document 103 and authorized character set 110 (or associated language 112) to the reporting phase 118.

The reporting phase 118 may use the authorized character set 110, the input document 103 (in original form), and the list of characters detected outside the associated character set 110 to create a variety of validation reports at operation 122. A report may be a simple reporting of the individual characters 108 found outside the authorized character set 110, a copy of the input document 103 with the location of the unauthorized characters highlighted within it, and a report on the unauthorized characters found and the language from which they came. The reporting phase 118 may be configurable as needed. In some examples, new report types can be created by writing new adapters 120.

In further examples, the reporting phase 118 includes receiving all the previously generated content (the input documents 103, the languages 112 used, and the list of unauthorized characters found outside the set) and accepting user input as to how this material is to be reported. In some examples, a user may instruct the system 100 to take the list of unauthorized characters that were found to be outside the relevant character set 110 and do one or more of the following: simply report what characters 108 were found, or report what characters 108 where found outside the character set 110 and, at operation 124, identify their exact location in the original input document 103, or identify the language 112 in which the unauthorized characters were found.

In instances of reporting just the list of unauthorized characters detected, the system 100 may print out or display, at operation 126, just the character list. Display or visualization at operation 126 of other result data is possible. Optionally, when identifying the locations of the unauthorized characters the system 100 may go back into the original (un-stripped) document 103 and locate each occurrence of a detected unauthorized character and highlight it before returning a marked-up document as part of a report.

Figure 2:
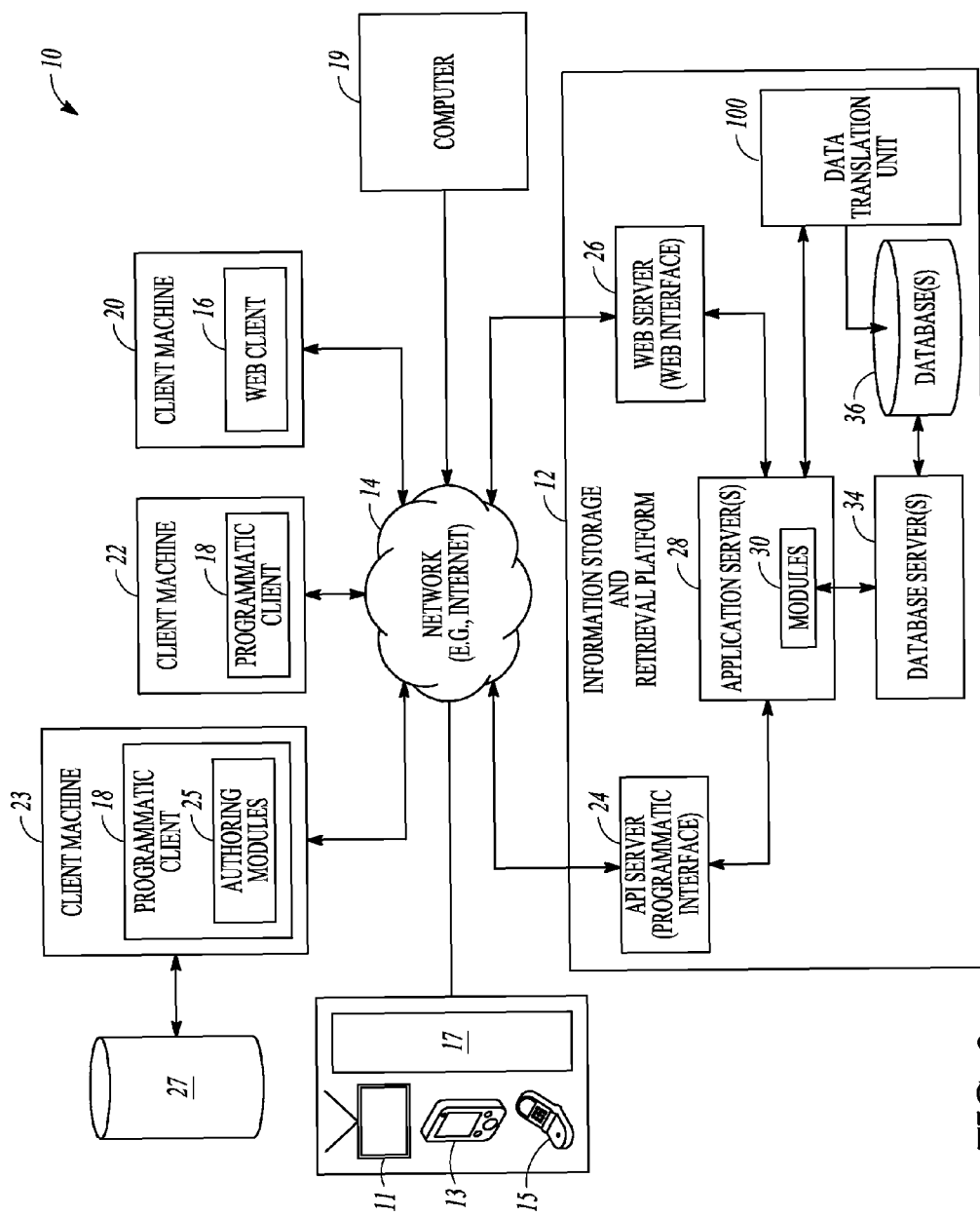
FIG. 2 is a network diagram depicting a system, according to an example embodiment, having a client-server architecture.

One example embodiment of a distributed network implementing a data evaluation system 100 described above is illustrated in the network diagram of FIG. 2 depicting an example ecommerce system 10 having a client-server architecture. A commerce platform or commerce server includes an information storage and retrieval platform 12, which provides server-side functionality, via a network 14 (e.g., the Internet) to one or more clients. As illustrated, ecommerce system 10 interacts with a web client 16 executing on a client machine 20, a programmatic client 18 executing on the client machine 22, and a programmatic client 18 in the form of authoring modules 25 executing on the client machine 23. Web client 16 in one embodiment is a web browser, but may employ other types of web services.

Within information storage and retrieval platform 12, Application Program Interface (API) server 24 and web server 26 are coupled to, and provide programmatic and web interface to, one or more application servers 28. Application servers 28 host one or more modules 30 (e.g., modules, applications, engines, etc.). Application servers 28 are, in turn, shown to be coupled to one or more database servers 34 that facilitate access to one or more databases 36. Modules 30 provide a number of information storage and retrieval functions and services to users accessing the information storage and retrieval platform 12. A user accesses information storage and retrieval platform 12 through network 14.

While ecommerce system 10 of FIG. 2 employs client-server architecture, the present disclosure is not limited to this architecture, and could be applied to a distributed, or peer-to-peer, architecture system. The various modules 30 and authoring modules 25 may also be implemented as stand-alone software programs, which do not necessarily have networking capabilities.

The web client 16 may access the various modules 30 via a web interface supported by web server 26. Similarly, programmatic client 18 accesses various services and functions provided by the modules 30 via the programmatic interface provided by the API server 24. In one example, programmatic client 18 is a seller application (e.g., the TurboLister® application developed by eBay Inc., of San Jose, Calif.) enabling sellers to author and manage data item listings, each listing corresponding to a product or products, on information storage and retrieval platform 12. Listings may be authored and modified when a client machine 20, 22, or 23 is not necessarily connected to information storage and retrieval platform 12, such as in an off-line manner. Client machines 20, 22 and 23 are further adapted to perform batch-mode communications between programmatic clients 18 and authoring modules 25, and information storage and retrieval platform 12. In addition, programmatic client 18 and web client 16 may include authoring modules similar to authoring modules 25 to author, generate, analyze, and publish categorization rules used in information storage and retrieval platform 12 to structure data items and transform queries. Transforming queries in one example embodiment uses a data dictionary with token pairs to expand a narrow keyword or to focus a broad keyword. The client machine 23 is further shown to be coupled to one or more databases 27. The databases 27 include information used by client machine 23 in implementing a service or operation, and may include specific information for products or services offered by client machine 23.

Users having access to service(s) provided by client machine 23, for example, include users of computer 19 and users of wireless network 17, which may serve as a common access point to network 14 for a variety of wireless devices, including among others a cable type television service 11, a Personal Digital Assistant (PDA) 13, and a cellular phone 15.

In one example, client machine 23 enables web services, wherein a catalog of web services is stored in information storage and retrieval platform 12. Client machine 23 stores information related to the web services in databases 27, wherein the information is used to identify associated services and offerings. The associated services and offerings are also listed in the catalog of web services. Descriptors of the associated services and offerings may be used to generate and modify a vocabulary for a data dictionary corresponding to the catalog of web services, such that a user search having keywords related to a first service may return results for a second service associated with the first service. Additionally, each of client machines 20, 22 and 23 may also be users that search data items in information storage and retrieval platform 12.

In another example, client machine 23 is an ecommerce client offering products to customers via network 14. Client machine 23 stores a catalog of products in information storage and retrieval platform 12, the catalog of products having a corresponding data dictionary. Client machine 23 stores information related to at least one product in databases 27. The information may include frequency of searches, resultant sales, related products, pricing information, and other information related to customer use of the ecommerce service 10. Additionally, databases 27 may store other product related information, such as style, color, format, etc. Client machine 23 may use the information stored in databases 27 to develop descriptor information for at least one product. Product descriptors and other product information may be used to generate and modify a vocabulary for a data dictionary corresponding to the catalog of products, such that a user search having keywords related to a first product may return results for a second product associated with the first service. In other embodiments, a client machine may store information in information and storage retrieval platform 12 related to business processes, or other applications which store data in a database which may be accessed by multiple users. To facilitate internationalization of the information that might be called for by the ecommerce client (client machine 23), a data translation unit 100 is provided. The data translation unit 100 may operate in the same manner as the data evaluation system 100 described further above with reference to FIG. 1. When a product descriptor or other information for example stored in the databases 27 calls for translation or internationalization, the unit 100 can execute one or more of the document phase 102, language phase 106, detection phase 114, or reporting phase 118 described further above. In one embodiment, the data translation unit 100 can operate automatically to control, verify and report on character set use in the translation of millions of files and associated data in large, global ecommerce platforms.

Figure 3:
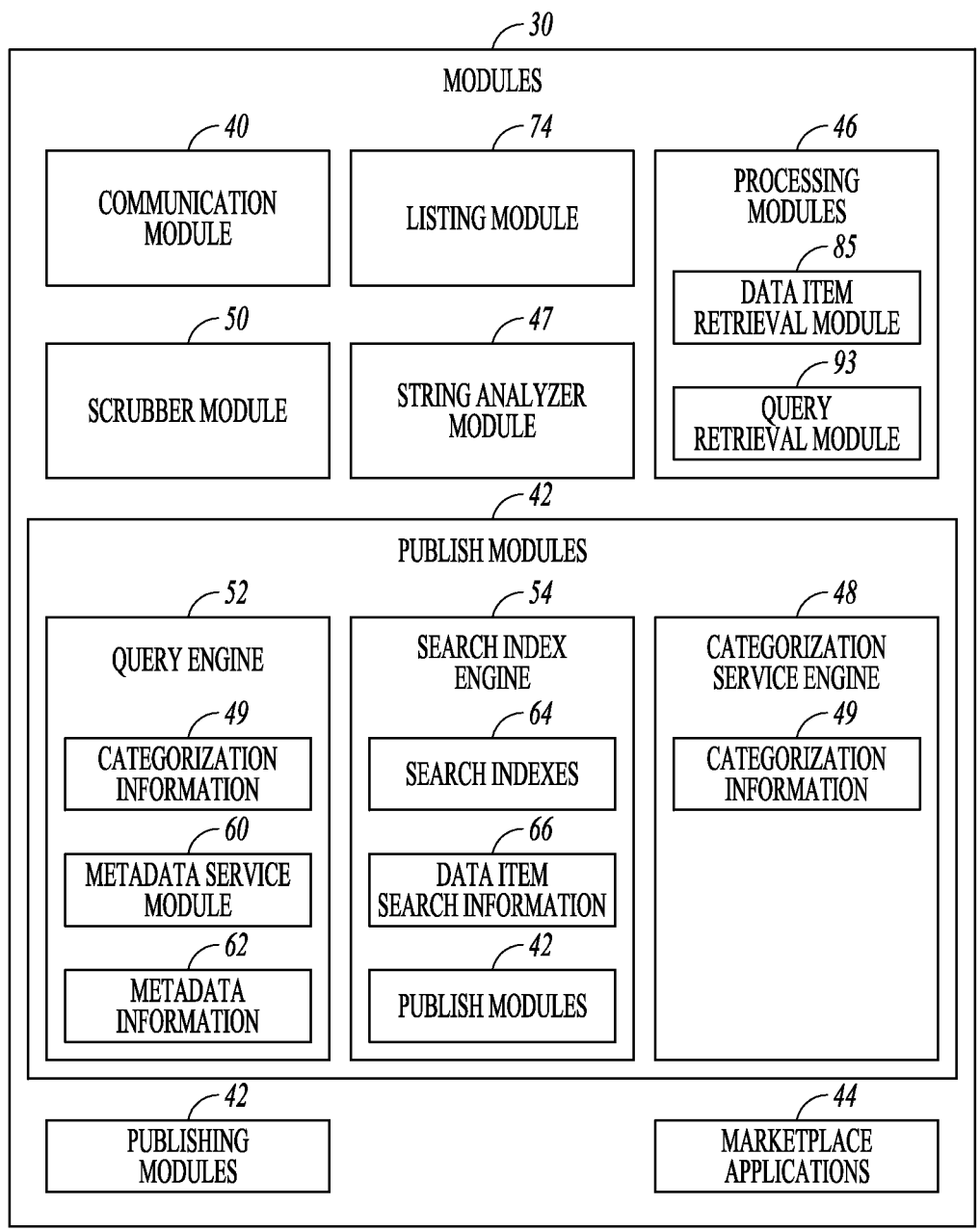
FIG. 3 is a block diagram illustrating modules and engines, according to an example embodiment.

Referring again to the ecommerce system 10 of FIG. 2, included within application servers 28 are various modules 30, which may be specific to the function and service provided within the network 14. One example of modules 30 is further detailed in FIG. 3 in block diagram form. The modules 30 include a communication module 40, which acts as a communication agent for interactions, messaging and data transmissions between and among information storage and retrieval platform 12 and clients and users through network 14. Clients and users include client machines 20, 22 and 23, computer 19, and devices 11, 13 and 15 connected through wireless network 17.

Listing module 74 receives information from a client for storage as a data item in databases 36. For example, a seller may operate a client machine 20 or 22 to enter information descriptive of a data item offered for sale or auction. Processing modules 46 receives categorization information and metadata for publication in a production environment or a preview environment. Processing modules 46 may publish to the production environment by publishing information to backend servers (not shown), query engine 52, search index engine 54, and categorization service engine 48. Processing modules 46 may publish to a preview environment by publishing information to a local backend server (not shown) hosting local versions of query engine 52, search index engine 54, and categorization service engine 48.

Processing modules 46 are further shown to include data item retrieval module 85 to receive data item requests from a category manager operating client machine 23. For example, responsive to receiving a request, data item retrieval module 85 reads data items from data item information stored on databases 36 and stores data items as sample information in the database 27.

Modules 30 further include scrubber module 50 to receive item information, such as entered from client machine 22 or 20 to initiate creation of a new data item or modification of an existing data item. Scrubber module 50 may utilize services of categorization service engine 48 to structure information to be associated with the data item. Categorization service engine 48 provides rules for selecting categories.

The data translation unit 100 may operate in one embodiment in conjunction with a string analyzer module 47 to leverage the string analysis functionality in executing the various phases described further above. A database utilized by string analyzer module 47 may include queries or data items entered by a user to information storage and retrieval platform 12. String analyzer module 47 analyzes strings of text to identify candidate values to associate with keywords. String analyzer module 47 receives requests from client machine 23 to identify candidate values to associate with a data item. A request may include descriptors, synonyms, or categories. In response to a request, string analyzer module 47 identifies strings of text in databases 36 that include at least a portion of the information included in the request. String analyzer module 47 relies on various services provided in information storage and retrieval platform 12 to identify and process strings of text. In one embodiment string analyzer module 47 identifies at least one boundary of a string of text based on a position of components contained in the string of text as well as derivatives thereof. For example, string analyzer module 47 may identify boundaries of a string of text based on a number of words to the left or right of a component in the string of text. In one embodiment, the number of words to identify is a configurable value. After a string of text has been identified, string analyzer module 47 may rely on a service available within or through information storage and retrieval platform 12 to remove certain words from the string or strings. For example, text strings may include 'stop' words which are words used so frequently in text that a typical full text search engine will skip during searching. These also include common words that add no significant help in a text search and may result in retrieval of excessive amounts of data items or records. Stop words include: the, a, and if, prepositions, etc. Stop words, used in isolation, are typically not considered as candidates for a data dictionary vocabulary, but may be included in a phrase which may be considered as a candidate. Next, string analyzer module 47 removes from the string any words, terms or phrases received in the request, as these are already assumed to be candidates in the current selection process for candidate token pairs. Finally, string analyzer module 47 returns the remaining words, terms and phrases as candidate token pair values to client machine 23.

Categorization service engine 48 applies categorization rules to data items to identify one or more category descriptors for association with the data item. Categorization service engine 48 applies categorization rules to data items, which may be referred to as listings, as new data items are added to information storage and retrieval platform 12, or responsive to publication of new rules.

Categorization service engine 48 processes data items received from client machines 20, 22. For example, scrubber module 50 may use services of categorization service engine 48 to apply categorization rules to a data item. The categorization service engine 48 may further store the data item, with the associated categorization information 49, in databases 36 as item search information. Further, categorization service engine 48 pushes or publishes item search information, such as over a bus in real time to search index engine 54. Further, categorization service engine 48 may execute in a preview environment to enable analysis of newly authored rules before publication of the rules to a production environment. Further, the categorization service engine 48 may maintain histogram information in the form of data item counters as categorization rules are applied to data items. For example, categorization service engine 48 may increment a data item counter responsive to a condition in a clause of a categorization rule, when the condition evaluates TRUE. Histogram information may be communicated to client machine 20 to determine percentage coverage for most popular queries, categories, and data item information.

Modules 30 include query engine 52 having categorization information 49, metadata service module 60, and metadata information 62. Metadata service module 60 may communicate metadata information 62 to communication module 40 based on a received query from communication module 40, wherein metadata information 62 may include metadata communication module 40 uses to format and generate an interface, such as a user interface. Search index engine 54 may include search indexes 64 and data item search information 66, which may include data items and associated category and descriptor information. In a production environment, search index engine 54 receives transformed queries from communication module 40 and utilizes search indexes 64 to identify data items based on the transformed query. Further, in a production environment, search index engine 54 communicates located data items to communication module 40.

Publishing modules 42 provide information for viewing and use by users as well as suppliers. Each set of publishing modules 42 is associated with a categorization service engine 48, a query engine 52, and a search index engine 54. Publishing modules 42 publish new and existing rules to a production environment or a preview environment for information storage and retrieval platform 12.

In one embodiment, information storage and retrieval platform 12 embodies a network-based marketplace (e.g., eBay® online service provider, the Worlds Online Marketplace™ developed by eBay Inc., of San Jose, Calif.) supporting data item transactions, such as for goods or services, between suppliers and users. In one example, information storage and retrieval platform 12 receives information from sellers to describe data items for sale, such information anticipated to be presented to potential buyers or bidders. In such an embodiment, modules 30 include marketplace applications 44 to provide a number of marketplace functions and services to users accessing information storage and retrieval platform 12.

In a preview environment, a category manager is able to analyze rules and determine whether such rules perform as expected without impacting the production environment, or live operations. For example, a preview environment may enable a query analysis to determine popular queries, a category coverage analysis, a descriptor coverage analysis, or a token pair coverage analysis. After determining that rules perform as expected, a category manager may publish the rules to the production environment in information storage and retrieval platform 12.

Communication module 40 may receive a query from client machine 20 or 22 having one or more constraints (e.g., keywords, categories, information specific to a type of data item, or other item-specific information. Communication module 40 may interact with query engine 52 and search index engine 54 to process the query.

Some embodiments of the present inventive subject matter include data translation methods. The data evaluation system or unit 100, or any one or more of the modules and system components described above, may in some examples be used or configured partially or entirely (either singly or in combination) to perform one or more of the methods described herein or in the following method embodiment.

Figure 4:
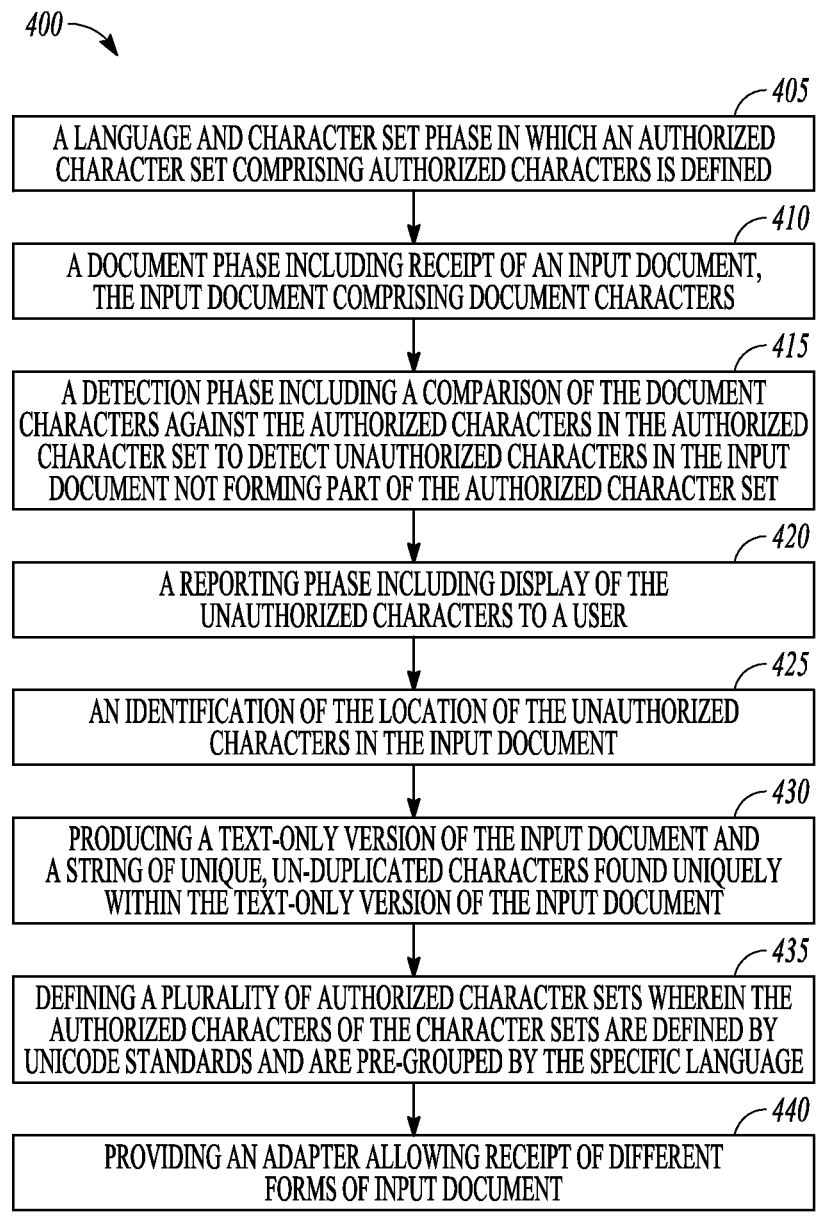
FIG. 4 illustrates a flow diagram for a method, according to an example embodiment.

An example method embodiment is illustrated in FIG. 4 of the accompanying drawings. In this example embodiment, a data translation method 400 comprises: at operation 405, a language and character set phase in which an authorized character set comprising authorized characters is defined; at operation 410, a document phase including receipt of an input document, the input document comprising document characters; at operation 415, a detection phase including a comparison of the document characters against the authorized characters in the authorized character set to detect unauthorized characters in the input document not forming part of the authorized character set; and, at operation 420, a reporting phase including display of the unauthorized characters to a user.

In some examples, the reporting operation 420 further comprises, at operation 425, an identification of the location of the unauthorized characters in the input document. The language and character set operation 405 may further comprise, at operation 430, producing a text-only version of the input document and a string of unique, un-duplicated characters found uniquely within the text-only version of the input document. The authorized character set may include a group of one or more alpha, numeric, punctuation and symbols for a specific language. The specific language may be a pre-defined or standardized language, or a custom configured language.

In some examples, method 400 further comprises, at operation 435, defining a plurality of authorized character sets wherein the authorized characters of the character sets are defined by Unicode standards and are pre-grouped by the specific language. In some examples, the document operation 410 further comprises, at operation 440, providing an adapter allowing receipt of different forms of input document.

EXAMPLE EMBODIMENT STATEMENTS

To further illustrate the subject matter disclosed herein, a non-limiting list of examples is provided here:

System

1. A data evaluation system comprising: at least one module, executing on one or more computer processors, to implement a language and character set phase in which an authorized character set comprising authorized characters is defined; a document phase including receipt of an input document, the input document comprising document characters; a detection phase including a comparison of the document characters against the authorized characters in the authorized character set to detect unauthorized characters in the input document not forming part of the authorized character set; and a reporting phase including display of the unauthorized characters to a user.

2. The system of statement 1, wherein the reporting phase further comprises an identification of the location of the unauthorized characters in the input document.

3. The system of statement 1, wherein the language and character set phase further comprises: producing a text-only version of the input document, and producing a string of unique, un-duplicated characters found uniquely within the text-only version of the input document.

4. The system of statement 1, wherein the character set includes a group of one or more alpha, numeric, punctuation and symbols for a specific language, and wherein the specific language is a predefined or standardized language, or a custom configured language.

5. The system of statement 4, wherein the at least one module is further to implement defining a plurality of authorized character sets wherein the authorized characters of the character sets are defined by Unicode standards and are pre-grouped by the specific language.

6. The system of statement 1, wherein the document phase further comprises: providing an adapter allowing receipt of different forms of input document.

Method

7. A data translation method comprising: a language and character set phase in which an authorized character set comprising authorized characters is defined; a document phase including receipt of an input document, the input document comprising document characters; a detection phase including a comparison of the document characters against the authorized characters in the authorized character set to detect unauthorized characters in the input document not forming part of the authorized character set; and a reporting phase including display of the unauthorized characters to a user.

8. The method of statement 7, wherein the reporting phase further comprises: an identification of the location of the unauthorized characters in the input document.

9. The method of statement 7, wherein the language and character set phase further comprises: producing a text-only version of the input document, and producing a string of unique, un-duplicated characters found uniquely within the text-only version of the input document.

10. The method of statement 7, wherein the character set includes a group of one or more alpha, numeric, punctuation and symbols for a specific language, and wherein the specific language is a predefined or standardized language, or a custom configured language.

11. The method of statement 10, further comprising: defining a plurality of authorized character sets wherein the authorized characters of the character sets are defined by Unicode standards and are pre-grouped by the specific language.

12. The method of statement 7, wherein the document phase further comprises: providing an adapter allowing receipt of different forms of input document.

Machine Readable Medium

13. A machine readable medium, including instructions, which when read by a machine, cause the machine to perform: a language and character set phase in which an authorized character set comprising authorized characters is defined; a document phase including receipt of an input document, the input document comprising document characters; a detection phase including a comparison of the document characters against the authorized characters in the authorized character set to detect unauthorized characters in the input document not forming part of the character set; and a reporting phase including display of the unauthorized characters to a user.

14. The machine readable medium of statement 13, wherein the reporting phase further comprises: an identification of the location of the unauthorized characters in the input document.

15. The machine readable medium of statement 13, wherein the language and character set phase further comprises: producing a text-only version of the input document, and producing a string of unique, un-duplicated characters found uniquely within the text-only version of the input document.

16. The machine readable medium of statement 13, wherein the character set includes a group of one or more alpha, numeric, punctuation and symbols for a specific language, wherein the specific language is a predefined or standardized language, or a custom configured language.

17. The machine readable medium of statement 16, wherein the machine is further caused to implement a definition of a plurality of authorized character sets wherein the authorized characters of the character sets are defined by Unicode standards and are pre-grouped by the specific language.

18. The machine readable medium of statement 13, wherein the document phase further comprises: providing an adapter allowing receipt of different forms of input document.

Modules, Components and Logic

Certain embodiments are described herein as including logic or a number of components, modules, or mechanisms. Modules may constitute either software modules (e.g., code embodied on a machine-readable medium or in a transmission signal) or hardware modules. A hardware module is a tangible unit capable of performing certain operations and may be configured or arranged in a certain manner. In example embodiments, one or more computer systems (e.g., a standalone, client or server computer system) or one or more hardware modules of a computer system (e.g., a processor or a group of processors) may be configured by software (e.g., an application or application portion) as a hardware module that operates to perform certain operations as described herein.

In various embodiments, a hardware module may be implemented mechanically or electronically. For example, a hardware module may comprise dedicated circuitry or logic that is permanently configured (e.g., as a special-purpose processor, such as a field programmable gate array (FPGA) or an application-specific integrated circuit (ASIC)) to perform certain operations. A hardware module may also comprise programmable logic or circuitry (e.g., as encompassed within a general-purpose processor or other programmable processor) that is temporarily configured by software to perform certain operations. It will be appreciated that the decision to implement a hardware module mechanically, in dedicated and permanently configured circuitry, or in temporarily configured circuitry (e.g., configured by software) may be driven by cost and time considerations.

Accordingly, the term "hardware module" should be understood to encompass a tangible entity, be that an entity that is physically constructed, permanently configured (e.g., hardwired) or temporarily configured (e.g., programmed) to operate in a certain manner and/or to perform certain operations described herein. Considering embodiments in which hardware modules are temporarily configured (e.g., programmed), each of the hardware modules need not be configured or instantiated at any one instance in time. For example, where the hardware modules comprise a general-purpose processor configured using software, the general-purpose processor may be configured as respective different hardware modules at different times. Software may accordingly configure a processor, for example, to constitute a particular hardware module at one instance of time and to constitute a different hardware module at a different instance of time.

Hardware modules can provide information to, and receive information from, other hardware modules. Accordingly, the described hardware modules may be regarded as being communicatively coupled. Where multiple of such hardware modules exist contemporaneously, communications may be achieved through signal transmission (e.g., over appropriate circuits and buses) that connect the hardware modules. In embodiments in which multiple hardware modules are configured or instantiated at different times, communications between such hardware modules may be achieved, for example, through the storage and retrieval of information in memory structures to which the multiple hardware modules have access. For example, one hardware module may perform an operation and store the output of that operation in a memory device to which it is communicatively coupled. A further hardware module may then, at a later time, access the memory device to retrieve and process the stored output. Hardware modules may also initiate communications with input or output devices, and can operate on a resource (e.g., a collection of information).

The various operations of example methods described herein may be performed, at least partially, by one or more processors that are temporarily configured (e.g., by software) or permanently configured to perform the relevant operations. Whether temporarily or permanently configured, such processors may constitute processor-implemented modules that operate to perform one or more operations or functions. The modules referred to herein may, in some example embodiments, comprise processor-implemented modules.

Similarly, the methods described herein may be at least partially processor-implemented. For example, at least some of the operations of a method may be performed by one or more processors or processor-implemented modules. The performance of certain of the operations may be distributed among the one or more processors, not only residing within a single machine, but deployed across a number of machines. In some example embodiments, the processor or processors may be located in a single location (e.g., within a home environment, an office environment or as a server farm), while in other embodiments the processors may be distributed across a number of locations.

The one or more processors may also operate to support performance of the relevant operations in a "cloud computing" environment or as a "software as a service" (SaaS). For example, at least some of the operations may be performed by a group of computers (as examples of machines including processors), with these operations being accessible via a network (e.g., the Internet) and via one or more appropriate interfaces (e.g., APIs).

Electronic Apparatus and System

Example embodiments may be implemented in digital electronic circuitry, or in computer hardware, firmware, software, or in combinations of them. Example embodiments may be implemented using a computer program product, for example, a computer program tangibly embodied in an information carrier, for example, in a machine-readable medium for execution by, or to control the operation of, data processing apparatus, for example, a programmable processor, a computer, or multiple computers.

A computer program can be written in any form of programming language, including compiled or interpreted languages, and it can be deployed in any form, including as a stand-alone program or as a module, subroutine, or other unit suitable for use in a computing environment. A computer program can be deployed to be executed on one computer or on multiple computers at one site or distributed across multiple sites and interconnected by a communication network.

In example embodiments, operations may be performed by one or more programmable processors executing a computer program to perform functions by operating on input data and generating output. Method operations can also be performed by, and apparatus of example embodiments may be implemented as, special purpose logic circuitry (e.g., a FPGA or an ASIC).

The computing system can include clients and servers. A client and server are generally remote from each other and typically interact through a communication network. The relationship of client and server arises by virtue of computer programs running on the respective computers and having a client-server relationship to each other. In embodiments deploying a programmable computing system, it will be appreciated that both hardware and software architectures merit consideration. Specifically, it will be appreciated that the choice of whether to implement certain functionality in permanently configured hardware (e.g., an ASIC), in temporarily configured hardware (e.g., a combination of software and a programmable processor), or a combination of permanently and temporarily configured hardware may be a design choice. Below are set out hardware (e.g., machine) and software architectures that may be deployed, in various example embodiments.

Example Machine Architecture and Machine-Readable Medium

Figure 5:
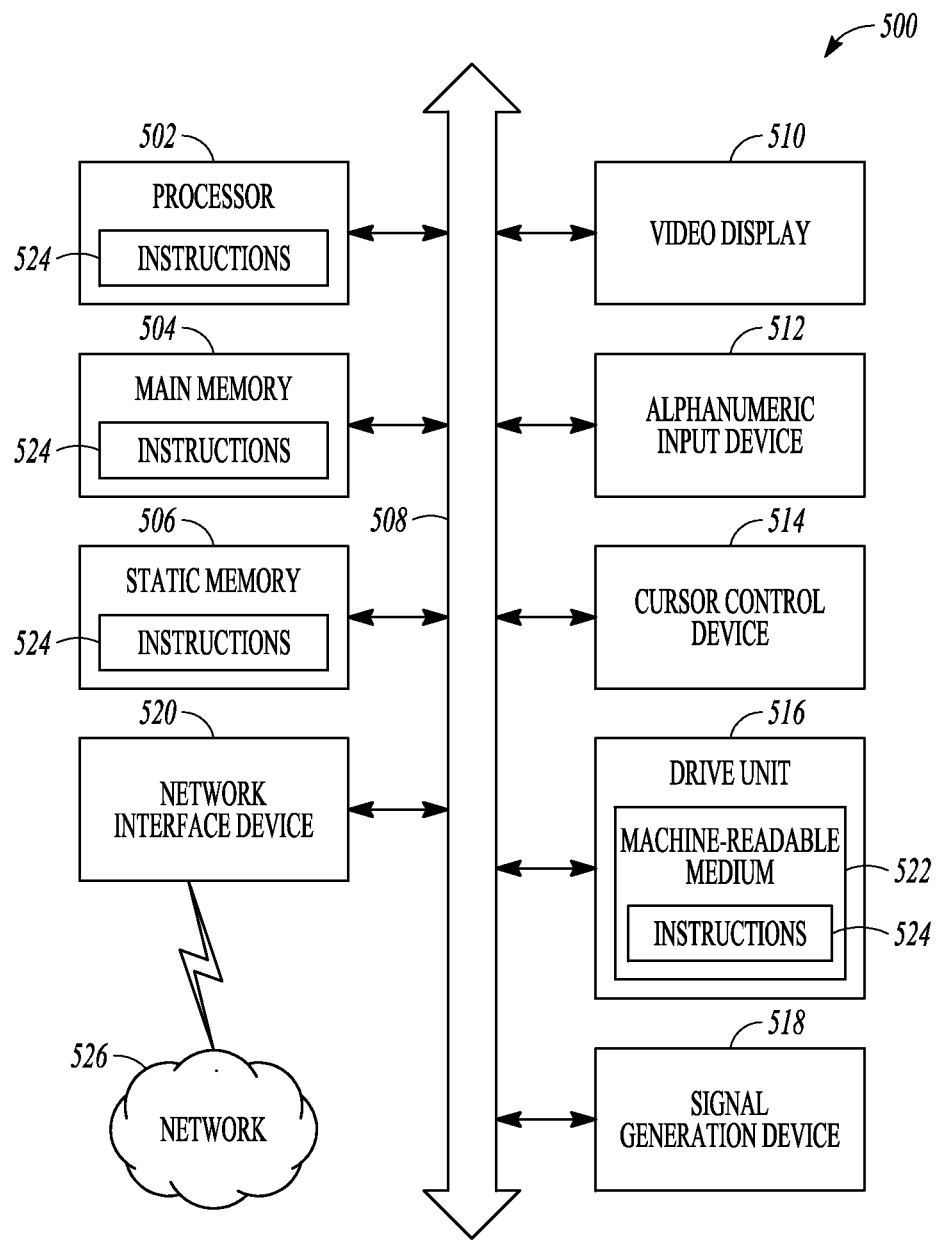
FIG. 5 is a block diagram of a machine, according to an example embodiment, including instructions to perform any one or more of the methodologies described herein.

FIG. 5 is a block diagram of a machine in the example form of a computer system 500 within which instructions 524 may be executed for causing the machine to perform any one or more of the methodologies discussed herein. In alternative embodiments, the machine operates as a standalone device or may be connected (e.g., networked) to other machines. In a networked deployment, the machine may operate in the capacity of a server or a client machine in server-client network environment, or as a peer machine in a peer-to-peer (or distributed) network environment. The machine may be a personal computer (PC), a tablet PC, a set-top box (STB), a PDA, a cellular telephone, a web appliance, a network router, switch or bridge, or any machine capable of executing instructions (sequential or otherwise) that specify actions to be taken by that machine. Further, while only a single machine is illustrated, the term "machine" shall also be taken to include any collection of machines that individually or jointly execute a set (or multiple sets) of instructions to perform any one or more of the methodologies discussed herein.

The example computer system 500 includes a processor 502 (e.g., a central processing unit (CPU), a graphics processing unit (GPU) or both), a main memory 504 and a static memory 506, which communicate with each other via a bus 508. The computer system 500 may further include a video display unit 510 (e.g., a liquid crystal display (LCD) or a cathode ray tube (CRT)). The computer system 500 also includes an alphanumeric input device 512 (e.g., a keyboard), a user interface (UI) navigation (or cursor control) device 514 (e.g., a mouse), a disk drive unit 516, a signal generation device 518 (e.g., a speaker) and a network interface device 520.

Machine-Readable Medium

The disk drive unit 516 includes a machine-readable medium 522 on which is stored one or more sets of instructions 524 and data structures (e.g., software) embodying or used by any one or more of the methodologies or functions described herein. The instructions 524 may also reside, completely or at least partially, within the main memory 504, static memory 506, and/or within the processor 502 during execution thereof by the computer system 500, the main memory 504 and the processor 502 also constituting machine-readable media.

While the machine-readable medium 522 is shown in an example embodiment to be a single medium, the term "machine-readable medium" may include a single medium or multiple media (e.g., a centralized or distributed database, and/or associated caches and servers) that store the one or more instructions 524 or data structures. The term "machine-readable medium" shall also be taken to include any tangible medium that is capable of storing, encoding or carrying instructions for execution by the machine and that cause the machine to perform any one or more of the methodologies of the present inventive subject matter, or that is capable of storing, encoding or carrying data structures used by or associated with such instructions. The term "machine-readable medium" shall accordingly be taken to include, but not be limited to, solid-state memories, and optical and magnetic media. Specific examples of machine-readable media include non-volatile memory, including by way of example, semiconductor memory devices (e.g., Erasable Programmable Read-Only Memory (EPROM), Electrically Erasable Programmable Read-Only Memory (EEPROM)) and flash memory devices; magnetic disks such as internal hard disks and removable disks; magneto-optical disks; and CD-ROM and DVD-ROM disks.

Transmission Medium

The instructions 524 may further be transmitted or received over a communications network 526 using a transmission medium. The instructions 524 may be transmitted using the network interface device 520 and any one of a number of well-known transfer protocols (e.g., HTTP). Examples of communication networks include a LAN, a WAN, the Internet, mobile telephone networks, Plain Old Telephone (POTS) networks, and wireless data networks (e.g., WiFi and WiMax networks). The term "transmission medium" shall be taken to include any intangible medium that is capable of storing, encoding or carrying instructions for execution by the machine, and includes digital or analog communications signals or other intangible media to facilitate communication of such software.

Although the present inventive subject matter has been described with reference to specific example embodiments, it will be evident that various modifications and changes may be made to these embodiments without departing from the broader spirit and scope of the inventive subject matter. Accordingly, the specification and drawings are to be regarded in an illustrative rather than a restrictive sense. The accompanying drawings that form a part hereof, show by way of illustration, and not of limitation, specific embodiments in which the subject matter may be practiced. The embodiments illustrated are described in sufficient detail to enable those skilled in the art to practice the teachings disclosed herein. Other embodiments may be used and derived therefrom, such that structural and logical substitutions and changes may be made without departing from the scope of this disclosure. This Detailed Description, therefore, is not to be taken in a limiting sense, and the scope of various embodiments is defined only by the appended claims, along with the full range of equivalents to which such claims are entitled.

Such embodiments of the inventive subject matter may be referred to herein, individually and/or collectively, by the term "invention" merely for convenience and without intending to voluntarily limit the scope of this application to any single invention or inventive concept if more than one is in fact disclosed. Thus, although specific embodiments have been illustrated and described herein, it should be appreciated that any arrangement calculated to achieve the same purpose may be substituted for the specific embodiments shown. This disclosure is intended to cover any and all adaptations or variations of various embodiments. Combinations of the above embodiments, and other embodiments not specifically described herein, will be apparent to those of skill in the art upon reviewing the above description.

All publications, patents, and patent documents referred to in this document are incorporated by reference herein in their entirety, as though individually incorporated by reference. In the event of inconsistent usages between this document and those documents so incorporated by reference, the usage in the incorporated reference(s) should be considered supplementary to that of this document; for irreconcilable inconsistencies, the usage in this document controls.

In this document, the terms "a" or "an" are used, as is common in patent documents, to include one or more than one, independent of any other instances or usages of "at least one" or "one or more." In this document, the term "or" is used to refer to a nonexclusive or, such that "A or B" includes "A but not B," "B but not A," and "A and B," unless otherwise indicated. In the appended claims, the terms "including" and "in which" are used as the plain-English equivalents of the respective terms "comprising" and "wherein." Also, in the following claims, the terms "including" and "comprising" are open-ended; that is, a system, device, article, or process that includes elements in addition to those listed after such a term in a claim are still deemed to fall within the scope of that claim. Moreover, in the following claims, the terms "first," "second," and "third," and so forth are used merely as labels, and are not intended to impose numerical requirements on their objects.

The Abstract of the Disclosure is provided to comply with 37C.F.R. §1.72(b), requiring an abstract that will allow the reader to quickly ascertain the nature of the technical disclosure. It is submitted with the understanding that it will not be used to interpret or limit the scope or meaning of the claims. In addition, in the foregoing Detailed Description, it can be seen that various features are grouped together in a single embodiment for the purpose of streamlining the disclosure. This method of disclosure is not to be interpreted as reflecting an intention that the claimed embodiments require more features than are expressly recited in each claim. Rather, as the following claims reflect, inventive subject matter lies in less than all features of a single disclosed embodiment. Thus the following claims are hereby incorporated into the Detailed Description, with each claim standing on its own as a separate embodiment.

What is claimed is:

1. A data evaluation system comprising:
    at least one module, executing on one or more computer processors, to implement:
        a language and character set phase, to receive from a client device an authorized character set comprising some authorized characters from among one or more libraries of characters;
        a document phase including receipt of an input document, the input document comprising document characters;
        a detection phase including a comparison of the document characters against the authorized characters in the authorized character set to detect unauthorized characters in the input document not forming part of the authorized character set; and
        a reporting phase to receive from the client device a report configuration, and based on the report configuration cause display of the unauthorized characters to a user within a report.

2. The system of claim 1, wherein the reporting phase further comprises:
    an identification of a location of the unauthorized characters in the input document.

3. The system of claim 1, wherein the language and character set phase further comprises:
    producing a text-only version of the input document; and
    producing a string of unique, un-duplicated characters found uniquely within the text-only version of the input document.

4. The system of claim 1, wherein the character set includes a group of one or more alpha, numeric, punctuation and symbols for a specific language, and wherein the specific language is a predefined or standardized language, or a custom configured language.

5. The system of claim 4, wherein the at least one module is further to implement defining a plurality of authorized character sets wherein the authorized characters of the character sets are defined by Unicode standards and are pre-grouped by the specific language.

6. The system of claim 1, wherein the document phase further comprises:
    providing an adapter allowing receipt of different forms of input document.

7. A data translation method comprising:
    a language and character set phase, to receive from a client device an authorized character set comprising some authorized characters from among one or more libraries of characters;
    a document phase including receipt of an input document, the input document comprising document characters;
    a detection phase including a comparison of the document characters against the authorized characters in the authorized character set to detect unauthorized characters in the input document not forming part of the authorized character set; and
    a reporting phase to receive from the client device a report configuration, and based on the report configuration cause display of the unauthorized characters to a user within a report.

8. The method of claim 7, wherein the reporting phase further comprises:
    an identification of a location of the unauthorized characters in the input document.

9. The method of claim 7, wherein the language and character set phase further comprises:
    producing a text-only version of the input document; and
    producing a string of unique, un-duplicated characters found uniquely within the text-only version of the input document.

10. The method of claim 7, wherein the character set includes a group of one or more alpha, numeric, punctuation and symbols for a specific language, and wherein the specific language is a predefined or standardized language, or a custom configured language.

11. The method of claim 10, further comprising:
    defining a plurality of authorized character sets wherein the authorized characters of the character sets are defined by Unicode standards and are pre-grouped by the specific language.

12. The method of claim 7, wherein the document phase further comprises:
    providing an adapter allowing receipt of different forms of input document.

13. A non-transitory machine readable medium, including instructions, which when read by a machine, causes the machine to perform:
    a language and character set phase, to receive from a client device an authorized character set comprising some authorized characters from among one or more libraries of characters;
    a document phase including receipt of an input document, the input document comprising document characters;
    a detection phase including a comparison of the document characters against the authorized characters in the authorized character set to detect unauthorized characters in the input document not forming part of the character set; and
    a reporting phase to receive from the client device a report configuration, and based on the report configuration cause display of the unauthorized characters to a user within a report.

14. The non-transitory machine readable medium of claim 13, wherein the reporting phase further comprises:
    an identification of a location of the unauthorized characters in the input document.

15. The non-transitory machine readable medium of claim 13, wherein the language and character set phase further comprises:
    producing a text-only version of the input document; and
    producing a string of unique, un-duplicated characters found uniquely within the text-only version of the input document.

16. The non-transitory machine readable medium of claim 13, wherein the character set includes a group of one or more alpha, numeric, punctuation and symbols for a specific language, wherein the specific language is a predefined or standardized language, or a custom configured language.

17. The non-transitory machine readable medium of claim 16, wherein the machine is further caused to implement a definition of a plurality of authorized character sets wherein the authorized characters of the character sets are defined by Unicode standards and are pre-grouped by the specific language.

18. The non-transitory machine readable medium of claim 13, wherein the document phase further comprises:
    providing an adapter allowing receipt of different forms of input document.

* * * * *